Aug. 27, 1963

A. F. DONOVAN ETAL 3,102,016

GLASS BENDING METHOD

Original Filed Dec. 7, 1956

ARTHUR F. DONOVAN,
HENRI T. JACQUOT &
RONALD E. RICHARDSON

BY: Cushman, Darby & Cushman
ATTORNEYS

ARTHUR F. DONOVAN,
HENRI T. JACQUOT and
RONALD E. RICHARDSON

BY: Cushman, Darby & Cushman

ATTORNEYS

ARTHUR F. DONOVAN,
HENRI T. JACQUOT and
RONALD E. RICHARDSON

BY: Cushman, Darby & Cushman
ATTORNEYS

ARTHUR F. DONOVAN,
HENRI T. JACQUOT and
RONALD E. RICHARDSON

Aug. 27, 1963  A. F. DONOVAN ETAL  3,102,016
GLASS BENDING METHOD
Original Filed Dec. 7, 1956  9 Sheets—Sheet 5

ARTHUR F. DONOVAN,
HENRI T. JACQUOT and
RONALD E. RICHARDSON

BY: Cushman, Darby & Cushman
ATTORNEYS

ARTHUR F. DONOVAN,
HENRI T. JACQUOT and
RONALD E. RICHARDSON

BY: Cushman, Darby & Cushman
ATTORNEYS

ARTHUR F. DONOVAN,
HENRI T. JACQUOT and
RONALD E. RICHARDSON
BY: Cushman, Darby & Cushman
ATTORNEYS

Fig.23.

ARTHUR F. DONOVAN,
HENRI T. JACQUOT, and
RONALD E. RICHARDSON
BY: Cushman, Darby & Cushman
ATTORNEYS United States Patent Office 3,102,016
Patented Aug. 27, 1963

3,102,016
GLASS BENDING METHOD
Arthur F. Donovan, Sandwich East, Ontario, Henri T. Jacquot, Windsor, Ontario, and Ronald E. Richardson, Oshawa, Ontario, Canada, assignors to Pittsburgh Plate Glass Company, Pittsburgh, Pa.
Original application Dec. 7, 1956, Ser. No. 626,946, now Patent No. 2,961,801, dated Nov. 29, 1960. Divided and this application Apr. 4, 1960, Ser. No. 19,868
4 Claims. (Cl. 65—107)

This application is divided from our copending application Serial No. 626,946, now Patent No. 2,961,801, which relates to improvements in the construction of molds of the type that are employed in the bending of glass sheets to curved form. The advent in automobile design of wrap-around windshields and similar curved glass panels involving short radius bends has given rise to a need for efficient molds for the initial processing of the glass sheets that will ultimately be assembled to form such panels.

The principal technique employed in forming curved glass is now well developed and consists of laying a glass sheet, or a pair of superposed glass sheets, flat on a concave multi-part skeleton mold which is constructed to tend to take up a curved configuration when so permitted by softening of the glass. The mold with the glass sheet or sheets laid thereon is passed through a lehr whereby the glass is raised to a temperature sufficient to render it yieldable to the forces exerted upon it by the mold. In this manner the required shape is imparted to the glass.

It has become the practice to form skeleton molds for this purpose with pivoted end portions each of which either can be swung into a first position, when the flat cold glass is originally placed in position thereon (subsequently referred to as the "flat" orientation of the mold), or can move into a second position ("curved" orientation) as the resistance to bending of the glass decreases on exposure to high temperatures. Weighted arms are provided to act as counter-weights to compensate for the weight of the movable end portions of the mold and to urge such portions into the curved orientation.

There is a tendency, as the movable end portions of the mold turn upwards towards the curved orientation, for the weight of such end portions themselves to be less effective in resisting movement, due to the reduction in horizontal displacement of their centers of gravity from the pivotal axis. Often the reverse effect is experienced in respect of the counter-weight arms, since it is usual for these arms to achieve a generally horizontal disposition as the parts take up the curved orientation, when these arms will exert their maximum turning moment on the end mold portions. As a result of one or the other or both of these factors, there is a tendency for the turning moment exerted on the glass to be steadily increased as the bending operation proceeds. This is not an entirely desirable condition in many instances. A certain minimum initial turning moment must be provided if the bending operation is to commence at the proper stage in the passage of the mold through the lehr, and the corresponding maximum bending moment that will occur towards or at the end of the bending cycle may be too large for optimum efficiency of operation. If this final bending moment is too large, the fact will be manifest in such faults as overbending of the tips of the glass, the formation of non-smooth bends due to too rapid bending, or undesirable stress patterns in the glass.

The object of the present invention is to provide a method of glass bending which avoids the occurrence of undesirably high bending forces on the glass at certain times during the bending operation, more particularly the latter stages thereof.

In its broad aspect the invention provides a method of bending glass sheets comprising subjecting a glass sheet to be bent to glass softening temperature to heat-soften the sheet and applying a bending force to a portion of the heat-softened sheet to bend said portion into a curved orientation, the steps of initially employing a relatively large net force biasing said sheet portion towards said curved orientation, and, when said sheet portion attains a position part way towards said curved orientation, reducing the net force applied thereto.

The invention is illustrated by way of example in the accompanying drawings.

The main side bars of the mold as seen in FIGURES 1 to 5 are each designated by the reference numeral 1, the movable end portion at the end of the mold visible in the drawings being shown generally at 2. This movable end portion 2 consists of a bar 3 which, in the curved orientation of the mold (FIGURE 4), forms a contiguous smooth continuation of the main side bars 1. Each end of the bar 3 adjacent an end of a main side bar 1 is secured by suitable struts 4 to an arched bracket 5 to which there is further secured an arm 6 extending generally away from the end portion 2. The brackets 5 serve to mount the end portion 2 pivotally on a pair of vertical plates 7, each plate 7 being secured to an end of one of the main side bars 1. In the flat orientation of FIGURES 1 and 2 the two arms 6 extend almost vertically upwardly at an angle to the horizontal approximately equal to that through which it is desired to pivot the end portion 2 of the mold. A pair of weights 8 are secured to a plate 9 welded to each arm 6 intermediate its length, and a further weight 10 is mounted at the end of each arm 6. Each weight 10 is secured to its arm 6 by means of a bolt 11 which also serves as a pivot for an auxiliary arm 12 which forms an extension of the main arm 6. Each auxiliary arm 12 carries a further weight 13 at its free end and is free to turn under the influence of this weight into a substantially horizontal position, as appears from FIGURE 2. A stop 12' on the arm 12 engages the arm 6 to prevent further downward rotation of the arm 12. Conventional bracing members 19 maintain rigidity.

Figure 1:
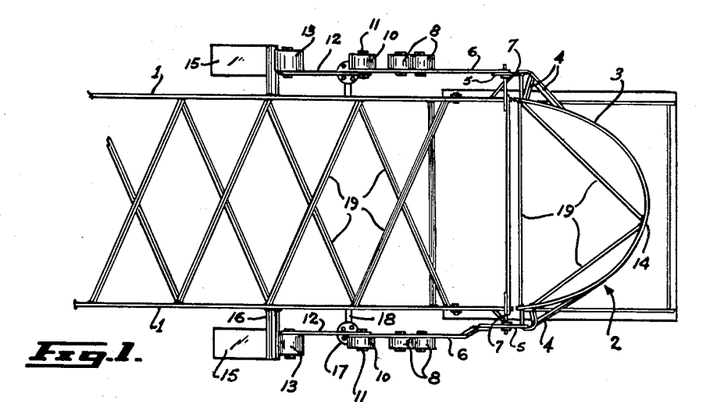
FIGURE 1 shows a plan view of the central area and one end of a concave skeleton mold. The other end of this mold will be identical in mirror image with the illustrated end and thus has not been shown. The mold parts are shown in their "flat" orientation.
Figure 5:
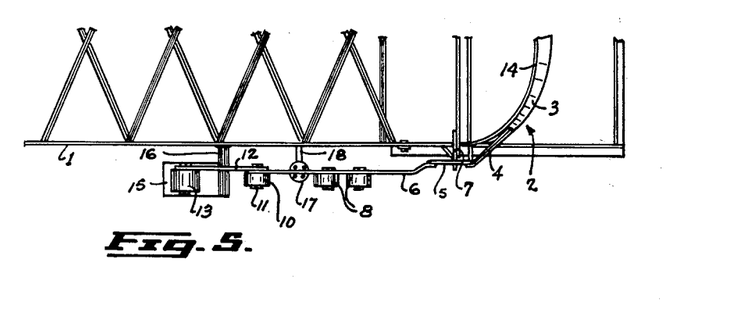
FIGURE 5 is a further fragmentary plan view similar to FIGURE 1 but showing the mold parts in the curved orientation seen in FIGURE 4.

As best seen in the plan views of FIGURES 1 and 5, the arms 6 and 12 carrying the weights 8, 10 and 13 are disposed outwardly of the side bars 1 in order to be free to move downwardly without encountering the glass sheet (not shown in the drawings) which will overlap the edges of the bars 1 by a small amount, generally about half an inch. The weight and rigidity of the glass will initially prevent upward movement of each end portion 2 of the mold, although the tip 14 of the bar 3 of such end portion will press upwardly against the underside of the glass near its extreme end with a force determined by the turning moment produced by the combined effects of the weights 8, 10 and 13 less that resulting from the weight of the end portion 2 itself. The parts will remain in the position seen in FIGURES 1 and 2 until the glass begins to soften as a result of the increasing temperature that it encounters through the lehr. Gradually the turning moment exerted by the weights, which will more than counter-balance the weight of the end portion itself, will take charge and the glass will allow the end portion at each end of the mold to swing slowly upwards.

Figure 3:
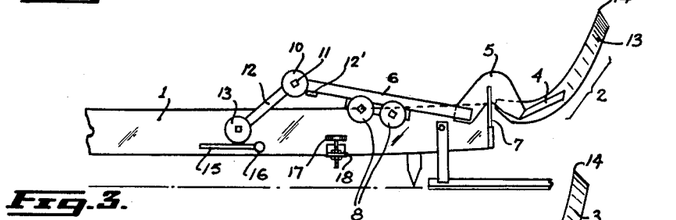
FIGURE 3 is a further side view corresponding to FIGURE 2 but showing the mold parts part way between the "flat" and curved orientations.
Figure 4:
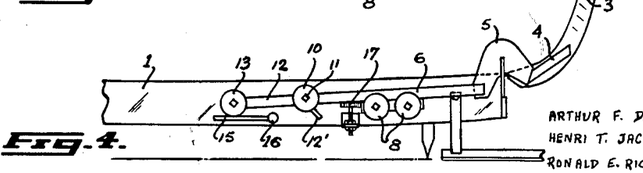
FIGURE 4 is a second side view similar to FIGURE 2 but showing the mold parts in the fully curved orientation.

The first part of each arm assembly to come into contact with a fixed part of the mold will be the weight 13. Each of these weights 13 will come to bear on a supporting shelf 15 secured to the fixed parts of the mold by means of a rod 16 extending outwardly from each side bar 1. The position as the weights 13 just contact the shelves 15 is seen in FIGURE 3. As the glass continues to yield to the bending forces and the movable end members continue to rotate, the main arms 6 will move further downwardly until each comes to rest on one of a pair of adjustable stops 17 secured by means of brackets 18 to the outside of each side bar 1. During this latter downward movement the weights 13 will roll along their respective shelves 15, their weight, or at least a substantial portion of it, being supported by such shelves. When the downward movement has finally been completely arrested by the stops 17, the parts will occupy the fully curved orientation seen in FIGURES 4 and 5.

Figure 2:
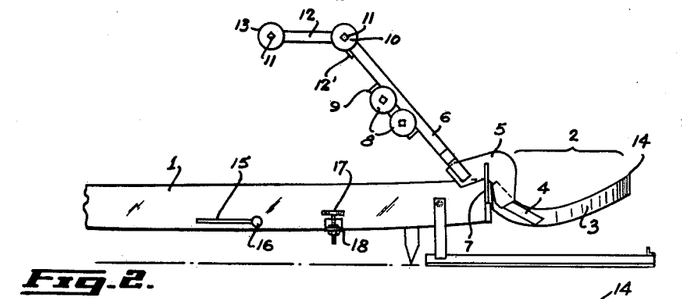
FIGURE 2 is a side view of the mold seen in FIGURE 1.
Figure 6:
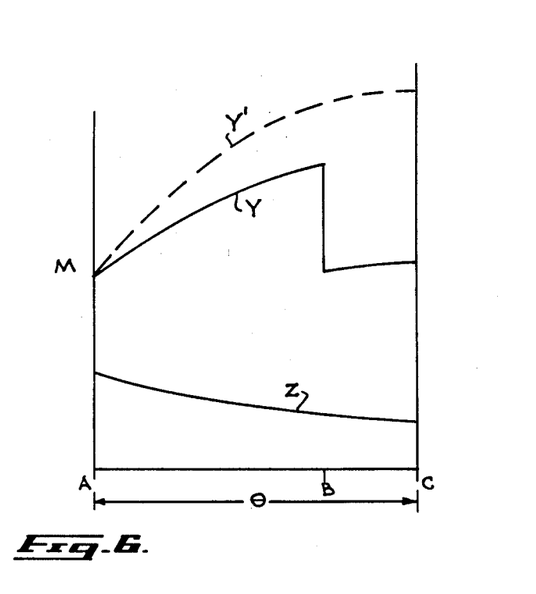
FIGURE 6 is a diagram illustrating the performance of the mold shown in the preceding figures.
Figure 7:
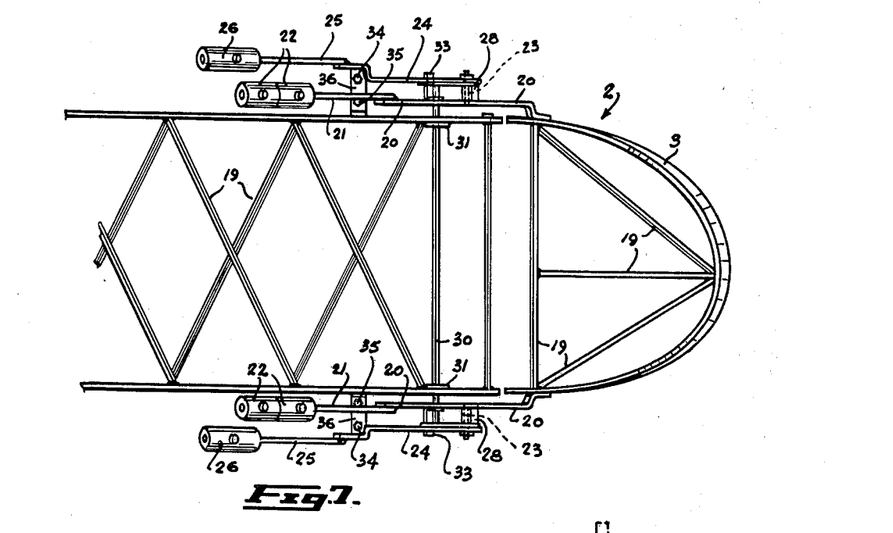
FIGURE 7 is a plan view similar to FIGURE 1, but showing a second mold with the mold parts in the "flat" orientation.

It will be apparent that the turning moment exerted on each end member 2 will gradually increase from the initial position seen in FIGURE 2 as the effective lever arm increases upon movement of the weights 8 and 10 a greater horizontal distance from the plates 7. Then, towards the end of this movement, there will be a sudden reduction in the turning moment consequent upon the support of the weights 13 by the shelves 15. The effective turning moment M exerted on the end portion 2 by the counterweight arms is shown in FIGURE 6 as curve Y plotted against angular displacement $\theta$ of the end portion. Point A is the fully "flat" orientation; point B represents the point at which the weights 13 touch the shelves 15; and point C represents the fully curved orientation. Curve Z shows the counter turning moment produced by the weight of the end portion itself, and the total turning moment will be the difference between the two curves Y and Z. It will be noted that these two curves have a tendency to diverge as the curved orientation of the mold is approached, which would give rise to a continuous increase in the effective force exerted on the glass by the mold as the bending operation proceeds. This characteristic which, as has been explained, is not always desirable, is at least partially offset by the step in the curve Y at the point B when the shelves 15 begin to support the weight of the weights 13.

The structure of the device produces an effective flattening of the curve Y in another respect which also acts to diminish the tendency for the curves to diverge. By reason of the horizontal disposition of the auxiliary arms 12 in the "flat" orientation (FIGURE 2), the left hand end of the curve Y is rather flatter than it would be if the arms 12 were in the form of continuous but otherwise similar extensions of the upwardly extending main arms 6. Thus for a given initial effective turning moment (the difference between curves Y and Z at point A) which will in practice be required not to fall short of a minimum value for satisfactory initiation of the bending process, the maximum and final turning moments are maintained at values not excessive for suitably bringing the bending operation to a prompt but unhurried conclusion with substantially no risk of over-bending or marking of the glass. A curve Y' shown in broken lines in FIGURE 6 represents the turning moment produced by a typical straight, rigid arm weighted to produce an initial turning moment equal to that produced by the present device. The greater divergence of this curve Y' from the curve Z, in comparison with the curve Y is immediately apparent.

A second mold is illustrated in FIGURES 7 to 10. The mold here shown is basically similar to that already described, consisting principally of side bars 1 and a movable end portion 2 comprised of a bar 3. In this instance the movable end portion 2 is pivotally mounted by means of a pair of arms 20, one end of each of such arms 20 being connected to one end of the bar 3, while the other end of such arm 20 has connected to it a rod 21 carrying a pair of weights 22. Intermediate its length, each of the arms 20 carries a pin 23 on which is pivotally mounted an auxiliary arm 24 having secured to its free end a rod 25 bearing a weight 26. The arms 24 with the rods 25 and weights 26 that they carry extend generally parallel with the arms 20, rods 21 and weights 22 outwardly thereof. The auxiliary arms 24 are thus pivotally mounted by the pins 23 on the arms 20. The whole assembly of the four arms and with them the end mold portion 2 is mounted to turn about pins 27. Each arm 20 is mounted on one of these pins by means of a plate 28 which is secured to the arm 20 and extends downwardly to engage over the pin 27. The pins 27 are fixed in relation to the main mold parts by means of upstanding brackets 29 on each side of the mold. These brackets 29 are held in position by means of a transversely extending rod 30 which in turn is secured to the side bars 1 by means of brackets 31.

Relative rotation between each main arm 20 and its auxiliary arm 24 is limited by an adjustable stop 32 mounted on a bracket 33 depending from the arm 20 and extending into a position beneath the arc of travel of the auxiliary arm 24. In addition, further adjustable stops 34 and 35 are provided secured to a bracket 36 projecting outwardly from each of the side bars 1. Each of the brackets 36 is arranged to position its stops 34 and 35 respectively in the path of travel of an auxiliary arm 24 and a main arm 20, as best appreciated from FIGURE 7.

Figure 8:
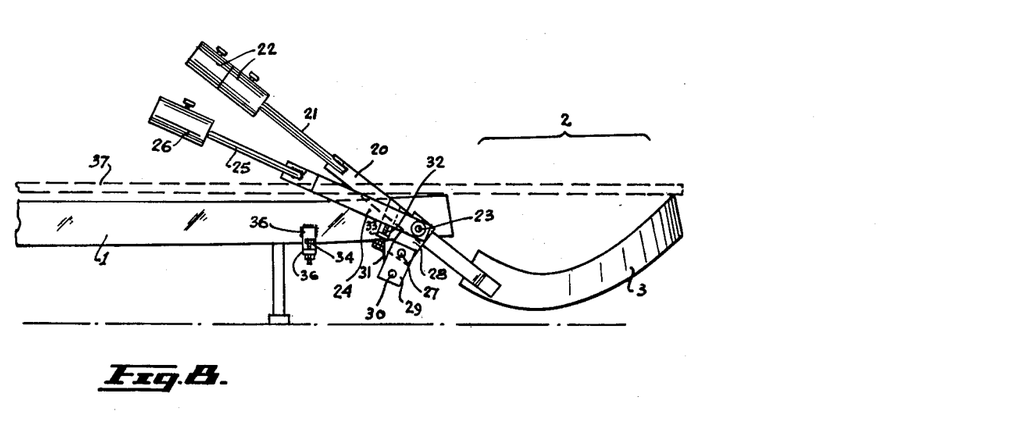
FIGURE 8 is a side view of FIGURE 7.
Figure 9:
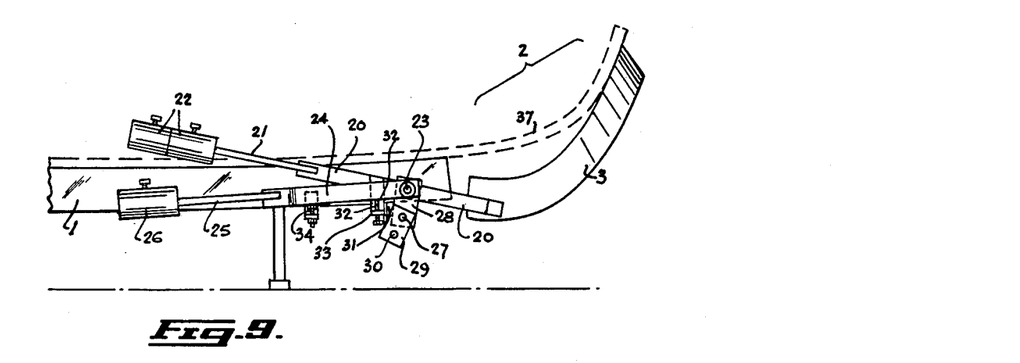
FIGURE 9 is a view similar to FIGURE 8 but showing the mold parts part way between the "flat" and curved orientations.
Figure 10:
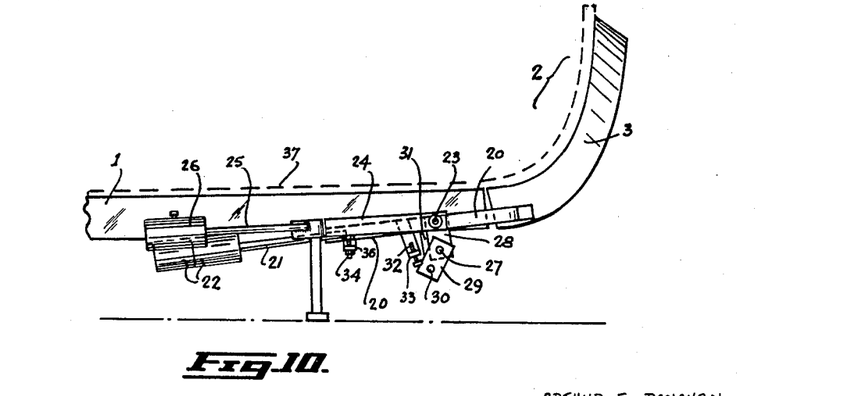
FIGURE 10 is a further side view similar to FIGURES 8 and 9 but showing the mold parts in the fully curved orientation.

Conventional bracing members 19 are provided, as before; and FIGURES 8, 9 and 10 also show in broken lines a sheet of glass 37 in the various positions that it takes up during the bending operation.

The basic operation of this second mold is the same as before, namely that the bending moment exerted on the end of the glass is reduced towards the end of the bending process. In the "flat" orientation shown in FIGURE 8, the weights 22 act directly through each of the main arms 20 to exert a turning moment on the end mold portion 2, while the weights 26 carried by the auxiliary arms 24 act through the stops 32 and brackets 33 to bear down on the main arms 20 and thus provide a further force tending to rotate the end mold portion 2 in an anticlockwise direction. Once the parts have assumed the position shown in FIGURE 9, the auxiliary arms 24 will come to rest on their respective stops 34 so that there will no longer be a transmission of force from such arms to the stops 32. The weight of the weights 26 will then be carried wholly by the stops 34 and the turning moment acting on the end mold portion 2 will be reduced to that produced by the weights 22.

Finally, when the parts reach the fully curved orientation, the main arms 20 will come to bear on their stops 35 and the bending operation will be complete. This position is shown in FIGURE 10. The total bending moment exerted by the assembly of weighted arms will thus be stepped in a manner similar to that demonstrated by the curve Y in FIGURE 6.

In the embodiment of FIGURES 7 to 10, the main and auxiliary arms are mounted to rotate about different axes. This is not essential and these arms may be arranged all to rotate about a common axis if this is convenient having regard to the general mold design.

Figure 11:
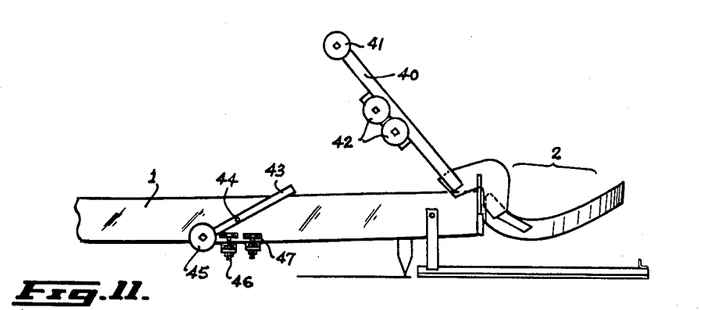
FIGURE 11 is a side view generally similar to FIGURES 2 and 8 but showing a third mold, the mold parts being in the "flat" orientation.
Figure 12:
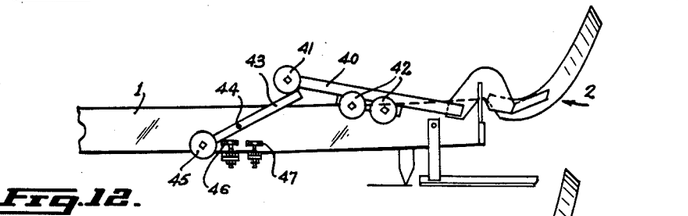
FIGURE 12 is a view similar to FIGURE 11 with the mold parts part way between the "flat" and curved orientations.
Figure 13:
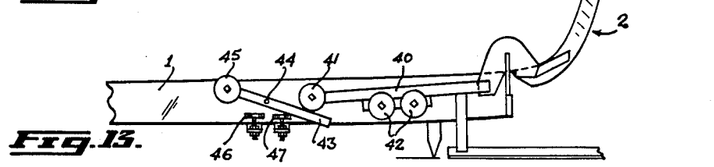
FIGURE 13 is a further similar view with the parts in the fully curved orientation.
Figure 14:
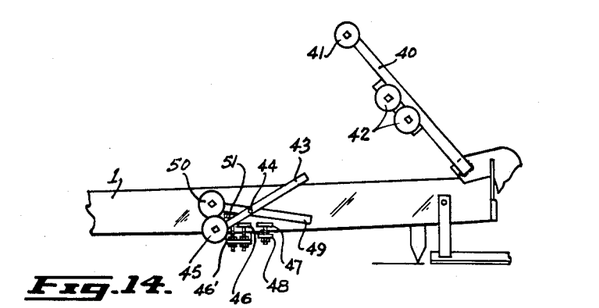
FIGURE 14 shows by means of a similar side view a fourth mold, the mold parts being in the "flat" orientation.

FIGURES 11 to 13 illustrate a further glass bending mold. These figures show a mold structurally substantially the same as the mold seen in FIGURES 1 to 5, except that the arms 40 which carry weights 41 and 42 for exerting a turning moment on the end mold portion 2 are simple rigid arms not provided with articulated auxiliary arms like the mold of FIGURES 1 to 5. In this embodiment of the invention, the reduced turning moment feature is obtained by means of pivotally mounted levers 43 that turn about pins 44 projecting outwardly from side bars 1. Only one set of these parts is shown, but, as in previous examples, they are duplicated on the remote side of the mold. Each of the levers 43 is arranged with one end in the path of travel of a part of an arm 40, conveniently the end weight 41. On its other end each lever 43 carries a weight 45 normally biasing such lever to the position shown in FIGURE 11. Anti-clockwise rotation beyond this point is prevented by an adjustable stop 46 mounted outwardly of the side bar 1. Clockwise rotation of each lever 43 is limited by an adjustable stop 47 also mounted on the neighboring side bar 1.

FIGURE 12 shows the position of the parts just as the weights 41 come to bear on the unweighted ends of the levers 43. Further movement of the end mold portion 2 in an anti-clockwise direction will serve to rotate the levers 43 clockwise against the action of the weights 45. Accordingly, the net anti-clockwise turning moment acting on the end mold portion 2 will be reduced from this stage in the operation until the parts finally reach the fully curved orientation shown in FIGURE 13, this position being determined by the adjustment of the stop 47.

A modification of this latter method of reducing the turning moment towards the end of the glass bending operation, is embodied in the mold construction shown in FIGURES 14 to 18. These figures show a similar unarticulated arm 40 carrying weights 41 and 42. In this instance, in addition to the single lever 43, a second lever 49 is employed. The primary lever 43 is similarly mounted on pin 44 and carries weight 45. Its anti-clockwise movement is limited by stop 46 and its clockwise movement by stop 47. The secondary lever 49 is also mounted to rotate about the pin 44, although this is not an essential feature for attainment of the required operation; it merely represents a structural convenience. The secondary lever 49 is mounted between the primary lever 43 and the adjacent side bar 1 and carries on its free end a weight 50. An adjustable stop 51 is mounted with stop 46 on bracket 46' which projects from the side bar 1. The stop 51 limits anti-clockwise rotation of the lever 49 but does not project into the path of travel of the primary lever 43. A second adjustable stop 52 is mounted on the same bracket 48 with the stop 47 and is arranged in the path of the secondary lever 49, serving to limit clockwise rotation thereof.

Figure 15:
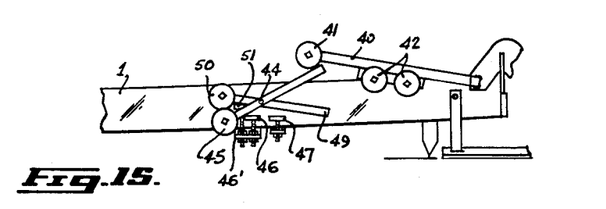
FIGURE 15 corresponds to FIGURE 14, but shows the mold parts in a first intermediate position between the "flat" and curved orientations.
Figure 16:
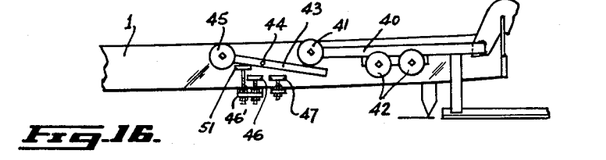
FIGURE 16 is another view similar to FIGURE 15 but showing the mold parts in a second intermediate position between the "flat" and curved orientations.
Figure 17:
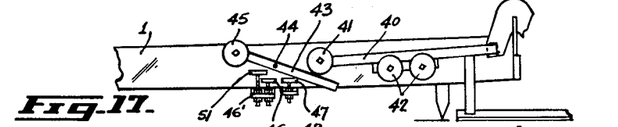
FIGURE 17 is a view corresponding to FIGURES 14 to 16 with the mold parts seen in the fully curved orientation.
Figure 18:
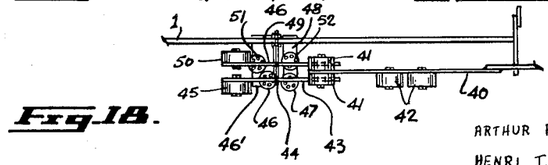
FIGURE 18 is a fragmentary plan view of the parts on one side of the mold in the position they occupy in FIGURE 17.
Figure 19:
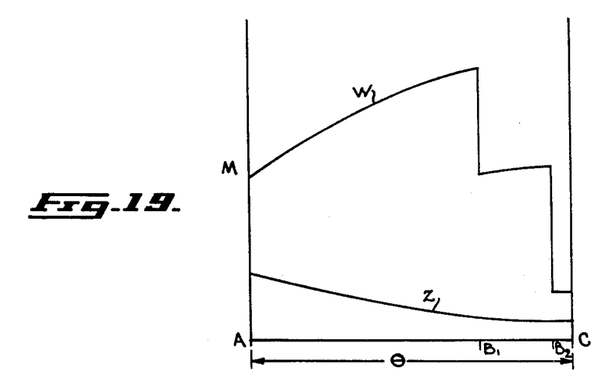
FIGURE 19 is a diagram illustrating the performance of the mold shown in FIGURES 14 to 18.
Figure 20:
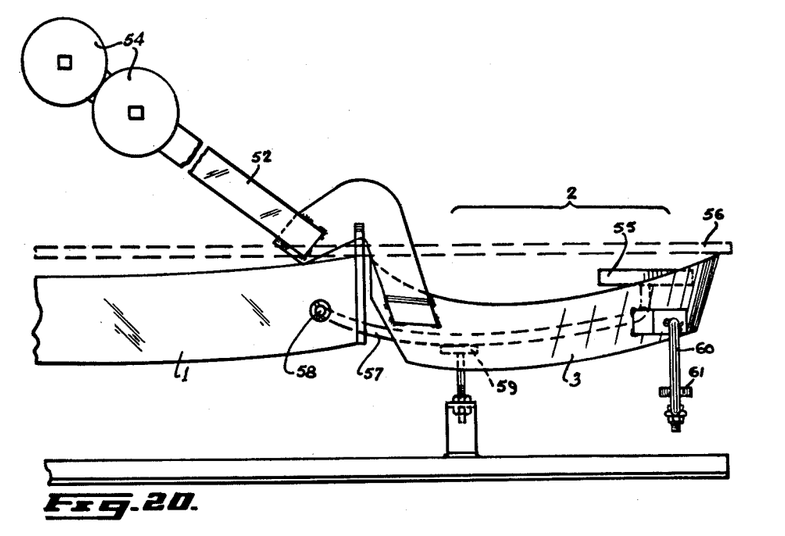
FIGURE 20 is a further side view of yet another mold showing the mold parts in the "flat" orientation.
Figure 21:
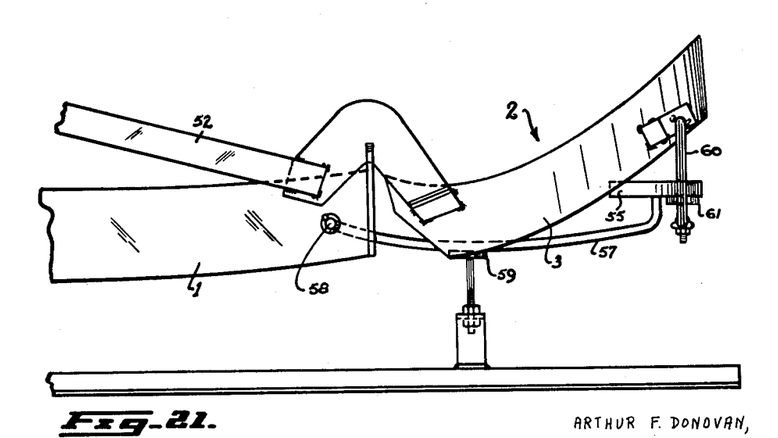
FIGURE 21 is a view similar to FIGURE 20 showing the mold parts part way towards the curved orientation.
Figure 22:
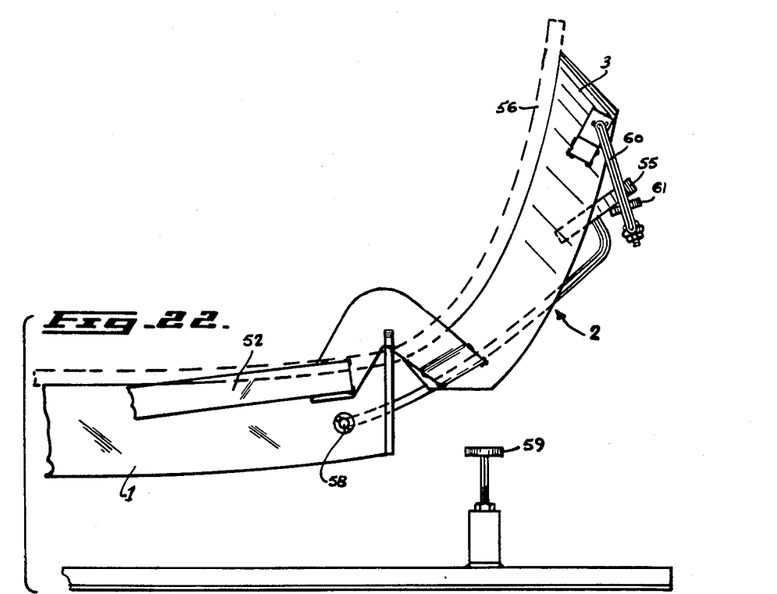
FIGURE 22 is a still further similar view showing the mold parts in the fully curved orientation.
Figure 23:
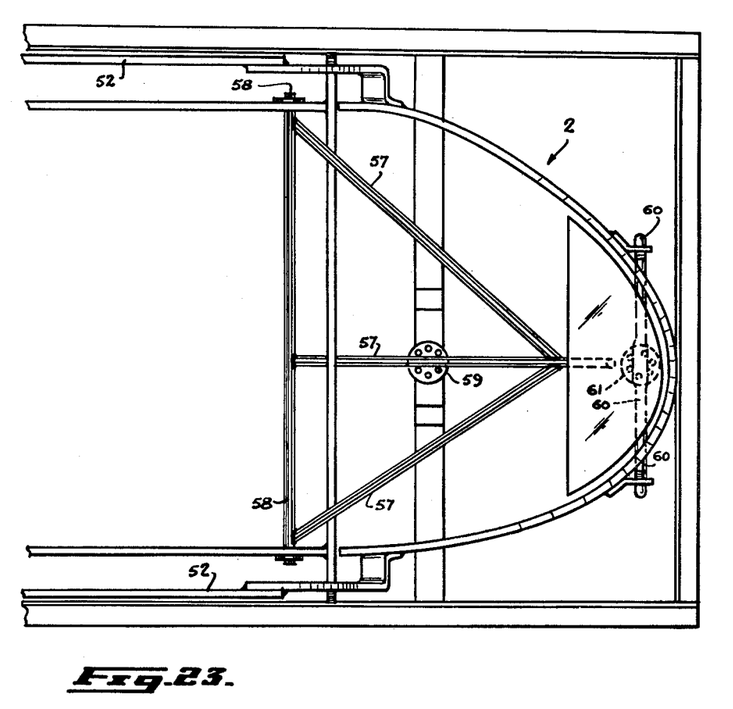
FIGURE 23 is a plan view of FIGURE 20.

The type of performance obtained with this double lever arrangement is illustrated in FIGURE 19 which is similar to FIGURE 6 in that the curve Z represents the turning moment exerted by the weight of the end mold portion itself; the point A represents the "flat" position of the mold; the point C represents the fully curved position of the mold; and the points B1 and B2 respectively represent the positions at which the weights 41 on the arms 40 engage the levers 43 and 49, i.e., the points of contact illustrated in FIGURES 15 and 16. The curve W replaces the former curve Y as representing the turning moment exerted by the weights on the end mold portion. The first step in this curve occurs at the point B1 when the weight 45 is raised from its stop 46 and the second step occurs at the point B2 when the weight 50 is raised from its stop 51. It will be observed that the point B2 is made very close to the point C in the embodiment illustrated, although there will be an infinite variety of choice in this respect to the designer. The double step in the curve has the advantage that the effective turning moment on the glass may be sharply reduced to almost zero just at the very end of the bending operation.

In the foregoing examples of the invention, the effective weight carried by the arm or arms situated on the side of the pivotal axis opposite that occupied by the end mold portion is modified in the latter stage of the bending operation. In accordance with a further embodiment of the invention, the modification of weight takes place on the same side of said pivotal axis as the end mold portion itself occupies. Instead of an effective weight reduction on the remote side of such axis, there is effectively a weight increase on the side of such axis on which the end mold portion is disposed. Such an alternative construction is illustrated in FIGURES 20 to 23.

These figures show a simple mold consisting, as before, of side bars 1 and a movable end portion 2 consisting of a bar 3. On each side of the mold there is provided an arm 52 which serves both pivotally to mount the end portion about plates 53 and also to support weights 54 which exert a turning moment on the end mold portion. It has been found convenient to employ a mold in which an internal thermal ballast member is used, for illustration of this aspect of the invention, because the ballast member can then readily be employed for the additional purpose of a weight. The thermal ballast device 55 is mounted within the inner periphery of the extreme end portion of the bar 3 of the end mold portion 2 (see particularly FIGURE 23) at a level slightly below the position of the glass 56 in the "flat" orientation of the mold (see FIGURE 20). Conveniently, this thermal ballast device 55, which serves to influence the temperature characteristics of the operation, and in particular to maintain the tip of the glass somewhat colder than the remainder of the glass in the early stages of the operation, is held in position by means of a plurality of rods 57 extending from connections to a transverse rod 58 extending between the ends of the main side bars 1 of the end portion of the mold. In the past, however, ballast devices of this type have been fixedly mounted either on the stationary parts of the mold or on the end portion, usually the former. Then, when the end mold portion is elevated as the mold assumes its curved orientation, the ballast device has either moved at all times with the end portion or has remained stationary so as to be well beneath the glass and no longer have any thermal influence on the temperature thereof by the time the later part of the bending operation has been reached. In order to employ this ballast device as a weight in accordance with the present invention, the mounting of the ends of the rod 58 in the side bars 1 is made pivotal in nature, so that the ballast device 55 may rotate about an axis along such rod 58. A stop 59 is provided to limit clockwise rotation of this assembly and to maintain the device 55 correctly spaced from the glass 56 in the "flat" orientation of the mold.

Figure 24:
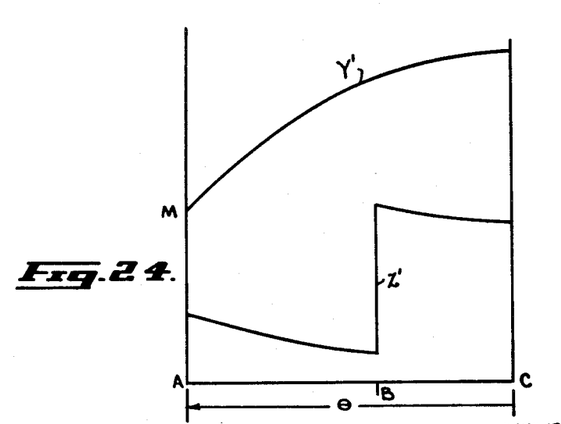
FIGURE 24 is a diagram illustrating the performance of the mold of FIGURES 20 to 23.

The end mold portion 2 shown in FIGURES 20 to 23 is fitted with a U-shaped bar 60 pivoted to the bar 3 to extend downwardly and across from one side to the opposite side thereof to underlie the device 55. An adjustable stop 61 is placed near the center of the bar 60 for co-operation with the undersurface of the device 55. In the "flat" orientation of the mold, the stop 61 lies well below the ballast device 55. After the parts have moved part way to the curved position (FIGURE 21) the stop 61 is brought to bear against the undersurface of the device 55. Continued movement of the end mold member 2 to the fully curved position shown in FIGURE 22 involves the lifting by such end member of the device 55 and its associated rods 57. This effectively modifies the total turning moment acting on the end mold portion in the manner shown in FIGURE 24 where the curve Y' is basically the same as the curve Y' seen in FIGURE 6. In this case at the point B which represents the point of engagement of stop 61 and device 55, the curve Z' is stepped up by reason of the extra weight added to the end member. As a result the effective final turning moment as represented by the distance between the curves Y' and Z' at the point C is reduced in the manner required.

We claim:

1. In a method of bending glass sheets comprising subjecting a glass sheet to be bent to glass softening temperature to heat-soften the sheet and applying a bending force to a portion of the heat-softened sheet to bend said portion into a curved orientation, the steps of initially employing a maximum net force biasing said sheet portion towards said curved orientation, and, when said sheet portion attains a position part way towards said curved orientation, suddenly reducing the net force applied thereto to a smaller net force biasing said sheet portion toward said curved orientation.

2. In a method of bending glass sheets comprising subjecting a glass sheet to be bent to glass softening temperature to heat-soften the sheet and applying a bending force to a portion of the heat-softened sheet to bend said portion into contact with a concave shaping surface and thereby into a curved orientation, the steps of initially employing a maximum net force upwardly lifting said sheet portion towards said curved orientation, and subsequently suddenly reducing such net force applied to said sheet portion to a smaller net force upwardly lifting said sheet portion towards said curved orientation when said sheet portion attains a position part way towards said curved orientation.

3. In a method of bending glass sheets comprising subjecting a glass sheet to be bent to glass softening temperature to heat-soften the sheet and applying a bending force to a portion of the heat-softened sheet to bend said portion into contact with a concave shaping surface and thereby into a curved orientation, the steps of initially employing a maximum net force upwardly lifting said sheet portion towards said curved orientation, and suddenly counteracting a portion of said net force applied to said sheet portion to a smaller net force upwardly lifting said sheet portion towards said curved orientation when said sheet portion attains a position part way towards said curved orientation.

4. In a method of bending glass sheets comprising subjecting a glass sheet to be bent to glass softening temperature to heat-soften the sheet and applying a bending force to a portion of the heat-softened sheet to bend said portion into contact with a concave shaping surface and thereby into a curved orientation, the steps of initially employing a maximum net force upwardly lifting said sheet portion towards said curved orientation, suddenly reducing such net force applied to said sheet portion to a smaller net force upwardly lifting said sheet portion towards said curved orientation when said sheet portion attains a position part way toward said curved orientation, and further suddenly reducing such net force applied to said sheet portion to a still smaller net force upwardly lifting said sheet portion towards said curved orientation when said sheet portion attains a position almost at said curved orientation.

References Cited in the file of this patent

UNITED STATES PATENTS

| | | |
|---|---|---|
| 2,348,279 | Boyles et al. | May 9, 1944 |
| 2,500,278 | Dunipace | Mar. 14, 1950 |
| 2,901,866 | McKelvey et al. | Sept. 1, 1959 |

FOREIGN PATENTS

| | | |
|---|---|---|
| 1,089,973 | France | Oct. 13, 1954 |